United States Patent [19]

Besemer et al.

[11] Patent Number: 5,326,864
[45] Date of Patent: Jul. 5, 1994

[54] METHOD FOR THE PREPARATION OF CALCIUM-BINDING POLYCARBOXY COMPOUNDS BASED ON POLYSACCHARIDES, AND REPLACEMENTS FOR PHOSPHATES IN DETERGENTS, BASED ON THESE POLYCARBOXY COMPOUNDS

[75] Inventors: Arie C. Besemer, Amerongen; Herman Van Bekkum, Vlaardingen, both of Netherlands

[73] Assignee: Nederlandse Organisatie Voor Toegepast-Natuurwetenschappelijk Onderzoek Tno, The Hague, Netherlands

[21] Appl. No.: 949,498

[22] PCT Filed: Apr. 26, 1991

[86] PCT No.: PCT/NL91/00068
  § 371 Date: Dec. 7, 1992
  § 102(e) Date: Dec. 7, 1992

[87] PCT Pub. No.: WO91/17189
  PCT Pub. Date: Nov. 14, 1991

[30] Foreign Application Priority Data

Apr. 27, 1990 [NL] Netherlands .................... 9001027

[51] Int. Cl.$^5$ .............................................. C08B 37/00
[52] U.S. Cl. ............................ 536/123.1; 252/174.18; 536/4.1; 536/123; 536/124
[58] Field of Search ............... 536/4.1, 124, 123.1, 536/123; 252/174.18

[56] References Cited

U.S. PATENT DOCUMENTS 4,029,590  6/1977  Finley .................... 252/174.18

FOREIGN PATENT DOCUMENTS 0427349  5/1981  European Pat. Off. .
1330123  9/1973  United Kingdom .

OTHER PUBLICATIONS

Die Starke vol. 37 No. 6 pp. 192–200 (1985) Nieuwenhuizen et al "Preparation & Calcium Complexation Properties of a Series of Oxidized Polysaccharides".
Chemical Abstracts, vol. 104, No. 20, May, 1986, Abstract No. 170459g for Japanese Patent 60–226502, Nov. 11, 1985.
J. Agn. Chem. for Japan, vol. 28, 1954 for Oxidation of Inulin with Periodate, pp. 357–363–Summary in English.
Die Starke, vol. 15, No. 6, by J. Potze et al. for "Uber den Einfluss der Reaktionsbedingungen auf die Oxydation der kartoffelstarke mit Hypochlorit".

*Primary Examiner*—Herbert J. Lilling
*Attorney, Agent, or Firm*—Bachman & LaPointe

[57] ABSTRACT

The invention provides a method for the preparation of a calcium-complexing polycarboxy compound by oxidising inulin in the presence of a low concentration of hypohalite, resulting in the production of a polycarboxyinulin containing about 1.2–2.6 carboxyl groups per monosaccharide unit. The hypohalite is preferably hypobromite, which can be produced in situ by chemical or electrochemical oxidation of a catalytic amount of bromide. The polycarboxyinulin can be used as a phosphate substitute in calcium-binding agents and detergents.

9 Claims, No Drawings

METHOD FOR THE PREPARATION OF CALCIUM-BINDING POLYCARBOXY COMPOUNDS BASED ON POLYSACCHARIDES, AND REPLACEMENTS FOR PHOSPHATES IN DETERGENTS, BASED ON THESE POLYCARBOXY COMPOUNDS

The invention relates to a method for the preparation of a calcium-complexing polycarboxy compound based on a polysaccharide.

From a technical standpoint, phosphates are the most suitable calcium-binding agents ("builders") in detergents. However, because the eutrophication of surface waters, the use of phosphates increasingly less desirable and there is therefore a need for to replace phosphates. Such agents must be able to bind calcium, and preferably also magnesium well and, in addition, be biodegradable, non-toxic and readily soluble in water and have no adverse influence on the action of the detergent and must also be inexpensive. agents have already been investigated, but only a few, such nitrilotriacetate, zeolites and polycarboxylates, meet the above-mentioned requirements to an extent which renders them also usable in practice. However, doubts are still being expressed as to the safety of nitrilotriacetate. Zeolites, polycarboxylates and nitrilotriacetate are not degradable, or are degradable to an inadequate extent, and, moreover, zeolites have the disadvantage that, because of the necessary "carrier" effect, they form usable "builders" only in combination with other agents. Polyacrylate is currently commonly used as a "co-builder" of this type.

Oxidised carbohydrates have also been proposed as substitutes phosphates. Polydicarboxysaccharides in particular have suitable characteristics for this purpose. These compounds can be obtained by oxidation of carbohydrates, for example with periodic acid followed by chlorite, or directly with hydrogen peroxide or sodium hypochlorite. During this oxidation, the two vicinal hydroxyl functions in the cyclic hexose unit (for example glucose) of the polysaccharide are converted into two carboxyl functions, with ring opening. Methods of this type have been disclosed, for example, in Netherlands Patent Application 70.12380, and M. Diamantoglou et al., Tenside Detergents 14, 250–256 (1977) and M. S. Nieuwenhuizen et al., Starch/Stärke 37, 192–200 (1985).

The known methods for the oxidation of polysaccharides have a number of disadvantages. The use of periodic acid is fairly expensive because of the necessary regeneration of the periodic acid and is laborious because the polysaccharide dialdehyde formed with periodic acid as an intermediate has to be further oxidised to the dicarboxylic acid using other agents, such as chlorite or hypochlorite. Hydrogen peroxide is also a relatively expensive oxidising agent and, moreover, makes the use of a catalyst, such as a tungsten compound, desirable for a sufficiently effective conversion; in addition, the low pH required for this reaction is a drawback because of the depolymerisation which occurs. The reaction with hydrogen peroxide is also not very specific, so that the 6-hydroxymethyl group is also oxidised to some extent and significant depolymerisation (chain shortening) takes place.

Polysaccharides that are oxidised with the known methods are always based on glucose, such as 1,4-α-glucans or -polyanhydroglucoses (starch, amylose, amylopectin and substances derived therefrom) and 1,4-β-glucans (cellulose and derivatives thereof). Nieuwenhuizen et al. (Starch/Starke 37, 192–200 (1985)) also investigated the oxidation of other polysaccharides, namely inulin (polyanhydrofructose) and alginate (polyanhydromannuronate/guluronate) with periodate/chlorite; the oxidation products thus obtained from these polysaccharides were, however, found to have poorer calcium-complexing properties than the oxidation products of polysaccharides based on glucose, such as starch and starch derivatives.

It has now been found that inulin can be oxidised in such a way that a polycarboxysaccharide is obtained which has a surprisingly high calcium- and magnesium-binding power, combined with a good biodegradability.

The method according to the invention is therefore characterised in that a polycarboxyinulin is prepared by oxidation of inulin in the presence of a low concentration of hypohalite.

Inulin is a polysaccharide which mainly consists of fructose units. Naturally occurring inulin is a 2,1-β-fructan with a terminal glucose unit. The structure of inulin is shown in the figure. The degree of polymerisation (DP) is highly dependent on the source of the inulin and can range from 6 to 100 or more. Inulin occurs, inter alia, in Jerusalem artichokes (*Helfanthus tuberosus*), artichokes (*Cynara scolyms*), chicory (*Cichorium intybus*), dahlias (*Dahlia* sp.) and dandelions (*Taraxacum officinale*). Inulin from Jerusalem artichokes has an average degree of polymerisation of about 15–30, depending on the stage of growth of the plant. The structure and possible uses of inulin are described, for example, by A. Fuchs and A. G. J. Voragen, Koolhydraten in Nederland (Carbohydrates in the Netherlands). 1988, 13–18.

Where inulin is mentioned in this description, this signifies any polysaccharide which to a substantial extent consists of 2,1-β-anhydrofructose units. Thus, the invention also applies to sinistrin, a branched inulin.

With the method according to the invention, the polycarboxyinulin which, depending on the reaction conditions chosen, contains on average about 1.5 to 2 carboxyl groups per fructose unit is obtained in virtually quantitative yield. This polycarboxyinulin has a degree of polymerisation which is little lower than that of the inulin used as starting material and is readily soluble in water and has good biodegradability. The structure of a polycarboxyinulin having 2 carboxyl groups per fructose unit can be represented schematically by the formula:

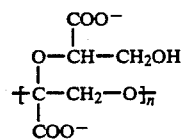

The calcium-binding power of the polycarboxy-inulin prepared in this way is better than that of the polycarboxyamylose and polycarboxymaltodextrin obtained in accordance with the known method, which latter compounds, in turn, belong to the best calcium-binding agents amongst the modified carbohydrates to date. The product obtained using the method under consideration is therefore outstandingly suitable as a replacement for phosphate in detergents, or as a cobuilder together with, for example, zeolite NaA, and for other similar applications.

The oxidation of polysaccharides with hypohalite, in particular hypochlorite, is known per se. Hypochlorite is a relatively inexpensive oxidising agent and leads to the desired dicarboxy product in one step. However, with the known methods the yield from the oxidation with hypochlorite is fairly low and incomplete oxidation and, additionally, depolymerisation occur and the characteristics of the product are unsatisfactory. Furthermore, in the known conversions, an approximately three-fold excess of hypochlorite is used, which is a disadvantage economically and ecologically.

It has been found that the said disadvantages do not occur or occur to a much smaller extent if a low concentration of oxidising agent is maintained during the oxidation reaction. A further improvement is achieved if hypobromite and/or hypoiodite is used as the actual oxidising agent. In contrast to the known oxidations of polysaccharides with hypochlorite, a stoichiometric amount of oxidising agent can then suffice. These measures are described in the earlier Dutch patent application 8902786, which was not published before the filing date of the present application. Furthermore, it is found that the oxidation proceeds more favourably because inulin is readily soluble in water.

The amount of oxidising agent required is appreciably smaller than in the case of the methods according to the prior art: according to the invention, less than 1.2 times the theoretical amount is used, compared with about 1.5–3 times this amount in accordance with the prior art.

In principle, three molecules of hypohalite are required per fructose unit for the oxidation of $C_3$–$C_4$ hydroxyl groups of inulin, in accordance with the empirical equation (in which X represents halogen):

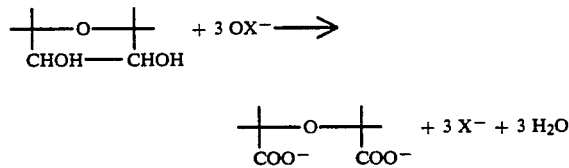

A more extensive oxidation of inulin is accompanied by oxidation of the hydroxymethyl group ($C_6$) of the fructose unit. However, the presence of such more highly oxidised units in the product does not have an adverse influence on the calcium-binding properties of the product. An incomplete oxidation of the $C_3$–$C_4$ hydroxyl groups also still provides a usable oxidation product. The inulin is oxidised in such a way that the oxidation product contains on average 1.0–3.0 and preferably 1.2–2.6 carboxyl groups per original fructose unit.

The oxidation of inulin can be carried out using hypohalite, in particular hypobromite or hypoiodite, as such, which is preferably supplied in the form of salt, For example as sodium hypobromite or potassium hypoiodite, but may also in part be supplied in acid form. In the text which Follows, for reasons of clarity, mention is made only of hypobromite, bromine, bromide, but the same also applies in principle for hypoiodite, iodine, iodide.

Preferably, the hypobromite is prepared in the reaction medium, for example by oxidation of a suitable bromine compound or by disproportionation of bromine to bromide and hypobromite. Since, in principle, there is back-formation of bromide on the oxidation of the polysaccharide by hypobromite, a smaller, for example catalytic, amount of bromide in the reaction mixture can then suffice.

The hypobromite can also be prepared in situ by oxidation of a bromide, for example sodium bromide, by electrochemical means, that is to say by withdrawal of electrons. In this case also there is back-formation of bromide during the oxidation and a catalytic amount therefore suffices. This oxidation can be carried out, for example, by passing an electric current for some time through a solution of the inulin bromide and, if appropriate, a base in an electrochemical cell which is known per se. Preferably, inert electrodes, for example made of graphite or platinum alloys or platinum or titanium, are used in this cell. By means of a suitable choice of electrical voltage and/or electrolyte concentration it can be ensured that the concentration of the oxidising agent remains low. The advantage of electrochemical oxidation is that the product contains much less salt ballast.

Furthermore, it has been found that hypobromite can be produced in a suitable concentration in the reaction medium by oxidation of bromide with chlorine-containing oxidising agents, such as chlorine, hypochlorite, chlorite, in particular hypochlorite. With this method, the concentration of oxidising agent is kept low, for example by adding the hypochlorite solution slowly dropwise to the reaction mixture or by passing chlorine gas slowly through the reaction mixture.

A catalytic amount of bromide is understood to be an amount of less than, for example, 20% of bromide in equivalents relative to the oxidation equivalents required. A larger amount is not harmful, but has no additional advantages worthy of note. Preferably, 0.5–10 equivalents of bromide are used per 100 theoretically required oxidation equivalents.

The bromide used can in principle be any bromide-containing salt. For reasons of cost, sodium bromide is preferred. In the case of the oxidation with hypochlorite, the bromide can preferably be added to the inulin but may optionally also be added to the hypo-chlorite.

An increased reaction rate can be obtained by adding a catalytic amount of a salt of cobalt, manganese, copper, nickel or iron (ca. 0.01–1%). This rate increasing effect was already reported for the oxidation of cellulose (T. P. Nayell and O. P. Singh, Text. Res. J. 56, 270 (1986); O. P. Singh, Text. Dyer Printer 15, 35 (1982); V. A. Shenai and R. B. Prasad, Text. Res. J. 42, 603 (1972) and 44, 671 (1974)) and the oxidation of starch (J. Potze and P. Hiematra, Starch/Stärke 15, 217 (1963)).

The oxidation can be carried out in a conventional manner. i.e. for example at a temperature of between 10° and 25° C., a pH of 7–11 and with slow addition of the oxidising agent, such as hypochlorite (usually dissolved in water), to the inulin.

If necessary, the temperature can be raised during the reaction in order to achieve a suitable reaction time and degree of conversion. Surprisingly, the result of the oxidation reaction is found to be better if during at least part of the reaction time a temperature of at least 35° C., and preferably of at least 40° C., is maintained. In this context it is possible, for example, to allow the reaction to start at room temperature and to raise the temperature after some time, for example after 1 to 4 hours. It is also possible, with a suitable rate of addition of the oxidising agent, to use such an elevated temperature during the entire reaction.

The reaction mixture is usually worked up by concentration and separation, for example by adding methanol and filtering off the precipitated product. A low pH of, for example, 6-8 can be maintained during working up. Working up at a higher pH has the disadvantage that undesired condensation reactions and associated yellow coloration can occur, while a low pH can give rise to hydrolysis and the depolymerisation associated therewith.

The salts, in particular sodium chloride, can also be separated off simply by direct evaporation of the reaction mixture, owing to the good solubility of the oxidised inulin in water at a pH of 6 or higher. Alternatively, the salts can be separated off by dialysis or ultrafiltration. After the salts have been removed in this way, the product is obtained by evaporation and, if necessary, further purification.

The reaction mixture can, however, also be concentrated in its entirety, followed by freeze-drying, spray-drying or a similar procedure. The product then still contains salts, such as sodium chloride and sodium bromide, but this does not have an adverse influence on the calcium-binding properties, so that a virtually equivalent calcium-binding agent can be obtained at lower production costs in this way. The working-up of the reaction mixture can even be dispensed with completely, in which case a readily usable, liquid calcium-binding agent is obtained, for example for use in liquid detergents.

The calcium-binding power of polymer substances can be expressed with the aid of the intrinsic complex constant $K_{int}$, where $K=Z/\{[Ca](1-Z)\}=K_{int}e^{cZ}$. In this equation Z is the degree of occupancy of the polymer and c is a constant for the polymer. Conversion of this equation gives $K_{int}=pCa+\log Z/(1-Z)-aZ$, where $a=c.\log e$ (see M. Floor, A. P. G. Kieboom and H. van Bekkum, Starch/Stärke 41, 348 (1989)). For the known polydicarboxysaccharides obtained by oxidation, this constant log $K_{int}$ is at best in the range of 6-7. The products obtained using the method under consideration have a log $K_{int}$ of between 7 and 9 or even higher. A parameter which is meaningful in practice for the calcium-complexing characteristics is the calcium-sequestering power (SC), which is defined as the number of mmoles of Ca(II) that can be added to 1 gram of complexing agent until the concentration of non-complex calcium reaches $10^{-5}$ M (M. Floor, A. P. G. Kieboom and H. van Bekkum, Starch/Stärke 41, 348 (1989)). The SC is about 1-1.75 for starch derivatives oxidised with hypochlorite and about 2.5 for starch derivatives oxidised with periodate and chlorite. The products obtained in accordance with the method under consideration have a SC of about 2, i.e. clearly higher than the known oxidised polysaccharides which are economically comparable.

The invention also relates to calcium- and/or magnesium-binding agents which contain polycarboxyinulin obtained in the manner described above. To further improve the calcium-binding properties, these agents can also contain other known "co-builders", such as phosphates, nitrilotriacetate and corresponding compounds such as ethylenediaminetetraacetate and oxydiacetate, and zeolites. In particular, the combination with zeolites yields an outstanding builder for detergents. In a mixture of a polycarboxyinulin with a zeolite, a ratio of 10:1 to 1:10 can, for example, be used, depending on the intended application.

The invention also relates to detergents which contain the above-mentioned calcium- and/or magnesium-binding agents, or the polycarboxyinulin obtained in the manner described above, in an effective amount.

EXAMPLE I 1.0 g of inulin (chicory) and 100 mg of sodium bromide were dissolved in 30 ml of water, A sodium hypochlorite solution (10 g $Cl_2$/100 ml) was added to the solution in small portions (about 0.5-1 ml). After an immediate rise in pH to about 11, the pH began to fall again. The pH was maintained at a value of 9-9.5 by adding 1 M NaOH. When the fall in the pH became slow, which indicates too low a hypochlorite concentration, fresh hypochlorite solution was added. In total 700 mE of $Cl_2$ were consumed. The oxidation reaction time was 3 hours. The product was isolated by concentrating the solution to a volume of 15 ml and pouring into 70 ml of methanol, with stirring. The precipitate was successively filtered off, washed with methanol and dried under reduced pressure. The isolated solution was 1.0 g.

The product has good calcium-binding properties, which can be seen from Table A, in which the most important reaction parameters are also indicated. The structure of the dicarboxy product was confirmed on the basis of the $^{13}C$ NMR spectrum.

EXAMPLE II 2.0 g of inulin (chicory), dissolved in 20 ml of water, were oxidised in accordance with the method of Example I, in the presence of 500 mg of NaBr. In total 15 ml of hypochlorite solution were consumed. The oxidation time was 20 hours. The isolated yield was 1.2 g. Both the dissolved product and the isolated product are found to have good calcium-binding properties. See Table A.

EXAMPLE III 2 g of sinistrin (squill) were oxidised in accordance with the method of Example I in the presence of 450 mg of NaBr with 16 ml of hypochlorite solution. The oxidation time was 20 hours. The results of the measurement of the calcium-binding power and on the isolated product are given in Table A.

EXAMPLE IV 5.95 g of inulin (Jerusalem artichoke) and 1.0 g of sodium bromide were dissolved in 100 ml of water. The inulin was oxidised in the manner described in Example I. 77 ml of hypochlorite solution were added in the course of 2½ hours. After this addition, the solution already displayed good calcium-binding properties; these were found clearly to improve further after a reaction time of 18 hours. The yield of isolated product was 5.0 g. The results are given in Table A.

EXAMPLE V

Example IV was repeated with the proviso that the reaction temperature was raised to 40°-45° C. when approximately half of the theoretically required amount to hypochlorite solution had been added. The total reaction time was shortened to 6 hours as a result. The consumption of hypochlorite at the end of the reaction was more than 90% of the theoretical amount. The consumption of alkali was also high (see Table A). The isolated product had an intrinsic complex constant of 9.1.

EXAMPLE VI 2.0 g of inulin (chicory) were oxidised in accordance with the method of Example I, but without bromide. The hypochlorite consumption was 12 ml instead of 7 ml. The results are given in Table A.

TABLE A

| Example | Temp °C. | Time (hours) | eq. HOCl % | Alkali consumption % 1) | Yield % 2) | $K_{int}$ | SC |
|---|---|---|---|---|---|---|---|
| I | 22 | 3 | 63 | n.d. | 50 | 7.1 | 1.0 |
| II | 22 | 20 | 57 | 45 | 65 | 7.8 | 1.75 |
| III | 22 | 20 | 61 | 50 | 65 | 9.0 | 2.0 |
| IV | 22 | 20 | 98 | 50 | 65 | 7.8 | 1.75 |
| V | 22–45* | 6 | 96 | 85 | >90 | 9.1 | 2.0 |
| VI | 22 | 3 | 91 | n.d. | n.d. | <4 | n.d. |

1) Alkali consumption relative to theory, in %
2) Based on a complete conversion with M = 236 of the disodium salt
*After 3 hours at 22° C., a further 3 hours at 40–45° C.
n.d. = not determined

We claim:

1. Method for the preparation of a calcium-complexing polycarboxy compound based on a polysaccharide, comprising oxidizing inulin in an aqueous reaction medium in the presence of a low concentration of hypohalite as an oxidizing agent, using a total amount of oxidizing agent of less than 1.2 times the amount required for the oxidation of each C3–C4 dihydroxyethylene group of the inulin to two carboxyl groups, to produce a polycarboxyinulin having an average of 1.0–3.0 carboxyl groups per monosaccharide unit.

2. Method according to claim 1, wherein the hypohalite comprises hypobromite.

3. Method according to claim 2, wherein hypobromite is generated in the reaction medium by oxidation of bromide present in a catalytic amount.

4. Method according to claim 3, wherein the bromide is oxidized with hypochlorite.

5. Method according to claim 3, wherein a temperature of 35° C. to 45° C. is maintained for at least the final part of the reaction time.

6. Method according to claim 3, wherein the bromide is oxidized electrochemically.

7. Method according to claim 2, wherein inulin is oxidized to a polycarboxyinulin having 1.2–2.6 carboxyl groups per monosaccharide unit.

8. Polycarboxyinulin having an average of 1.0–3.0 carboxy groups per monosaccharide unit prepared using the method according to claim 1.

9. Detergent which contains a polycarboxyinulin according to claim 8.

* * * * *